No. 663,430. Patented Dec. 11, 1900.
W. H. GILMAN.
ADVERTISING APPARATUS.
(Application filed Feb. 19, 1900.)

(No Model.) 3 Sheets—Sheet 1.

WITNESSES:
Charles F. Logan
O. W. Pizzeth

INVENTOR.
W. H. Gilman
BY Wright Brown & Quimby
ATTORNEYS.

No. 663,430. Patented Dec. 11, 1900.
W. H. GILMAN.
ADVERTISING APPARATUS.
(Application filed Feb. 19, 1900.)
(No Model.) 3 Sheets—Sheet 2.
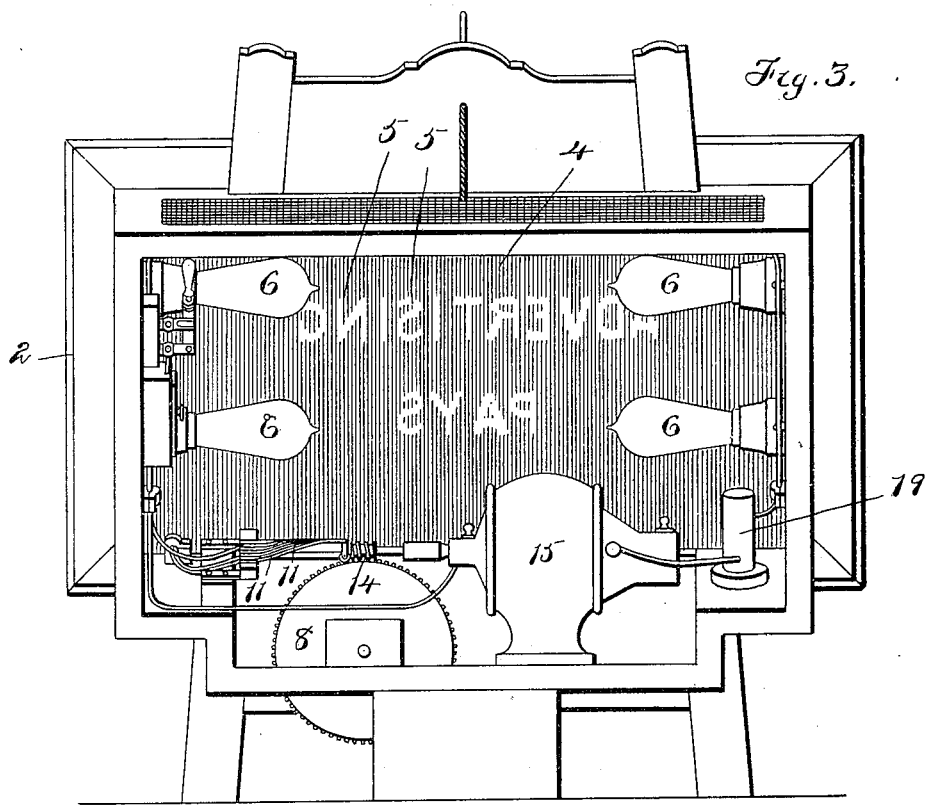
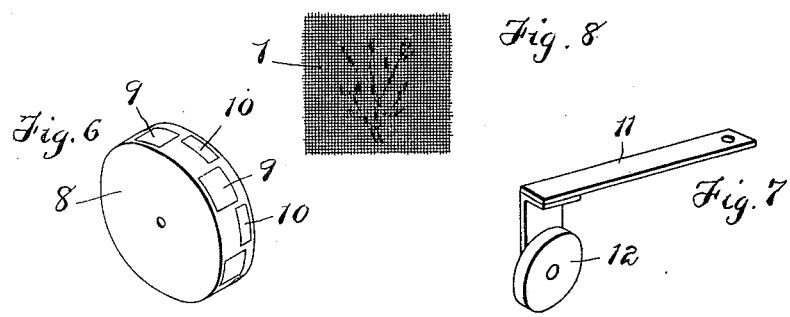
WITNESSES: INVENTOR.
Charles F. Logan W. H. Gilman
P. W. Pezzetti BY Wright Brown & Quinby
 ATTORNEYS.

No. 663,430. Patented Dec. 11, 1900.
W. H. GILMAN.
ADVERTISING APPARATUS.
(Application filed Feb. 19, 1900.)
(No Model.) 3 Sheets—Sheet 3.

WITNESSES: Charles F. Logan. P. W. Pezzetti.

INVENTOR. W. H. Gilman
BY Hught Brown Dunlury
ATTORNEYS.

UNITED STATES PATENT OFFICE.

WILLARD H. GILMAN, OF BOSTON, MASSACHUSETTS.

ADVERTISING APPARATUS.

SPECIFICATION forming part of Letters Patent No. 663,430, dated December 11, 1900.

Application filed February 19, 1900. Serial No. 5,673. (No model.)

*To all whom it may concern:*

Be it known that I, WILLARD H. GILMAN, of Boston, in the county of Suffolk and State of Massachusetts, have invented certain new and useful Improvements in Advertising Apparatus, of which the following is a specification.

In Letters Patent of the United States No. 636,721, granted to me November 7, 1899, an advertising or display apparatus is described, consisting of a translucent pane or sheet having a picture or design which when illuminated wholly from the front presents an opaque appearance, but is obscurable or effaceable by an excess of light thrown upon it from the back, and means for illuminating an area or areas of said pane from the back, the illuminated area permissibly having the form of letters or other symbols, whereby an illuminated advertisement is adapted to be exhibited in the midst of the picture.

The present invention consists in certain improvements on apparatus constructed on the above principle, the improvements relating principally to the construction of the translucent pane or sheet having the picture and also to means for intermittently illuminating the picture from the front.

My improvements will be more readily understood from the succeeding description and claims, taken in connection with the accompanying drawings, in which—

Figure 1:
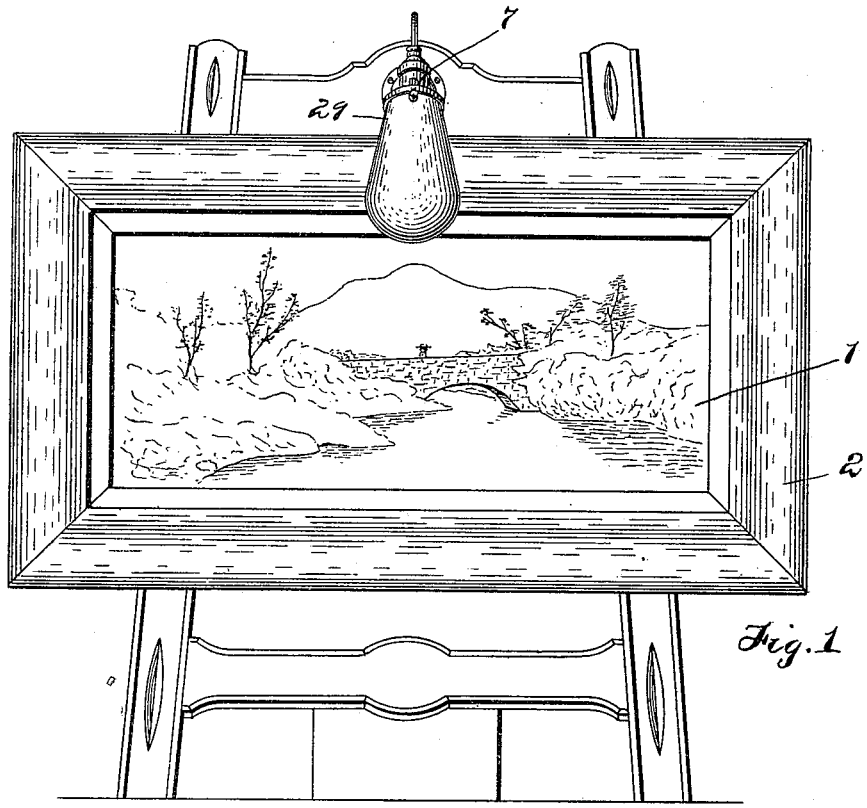
Figure 2:
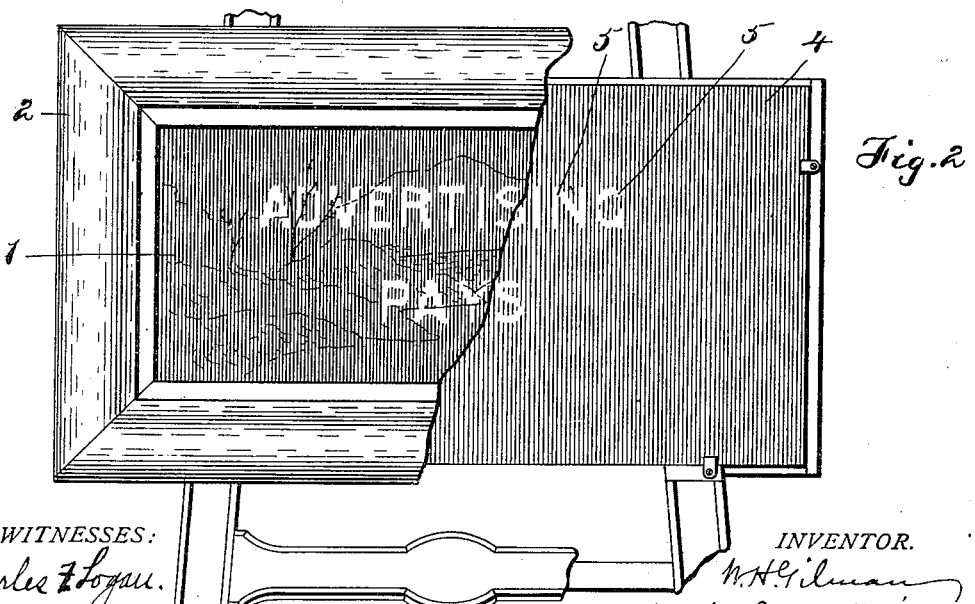
Figure 4:
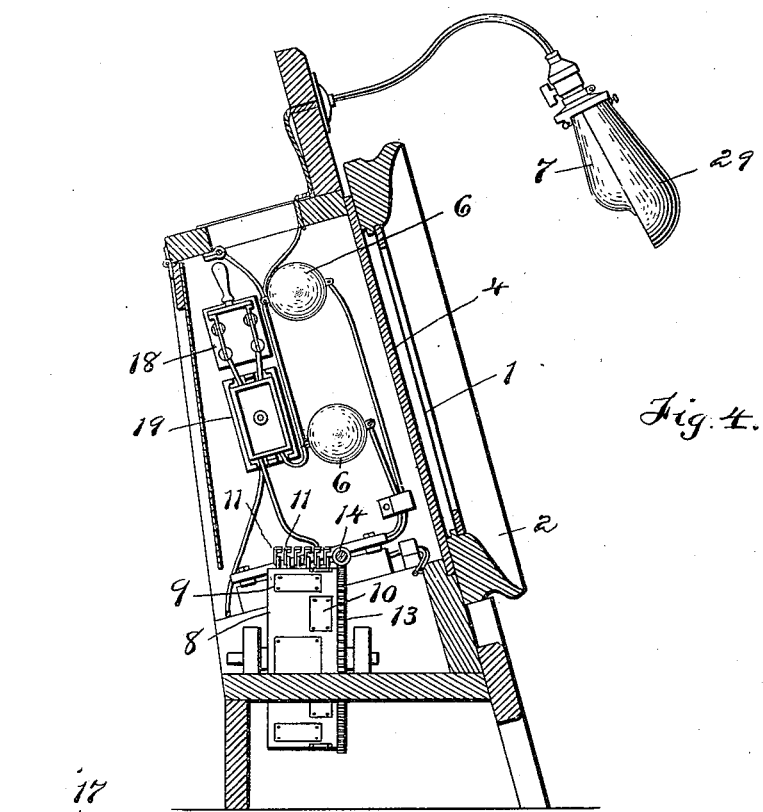
Figure 5:
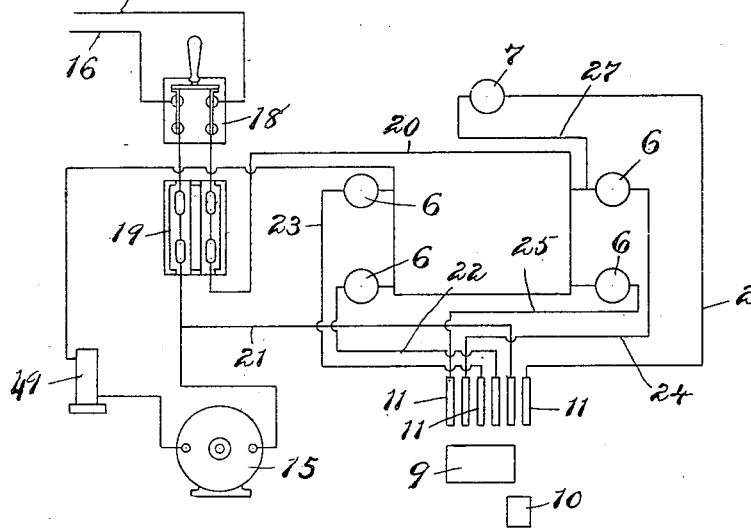

Figure 1 represents a front elevation of an advertising apparatus constructed in accordance with my invention. Fig. 2 represents a similar view with portions of the pane or sheet broken away, said view showing the illuminated advertisement. Fig. 3 represents a rear elevation of the apparatus, showing the interior of the casing. Fig. 4 represents a vertical sectional view. Fig. 5 represents a diagrammatic view of the electric circuits. Figs. 6 and 7 represent detail perspective views showing, respectively, the circuit-controlling cylinder and one of the brushes or contact-fingers. Fig. 8 represents a detail front elevation, enlarged, of a portion of the translucent pane. Fig. 9 represents a sectional view thereof.

The same reference characters indicate the same parts in all the figures.

Referring to the drawings, 1 designates a translucent pane or sheet surrounded by a frame 2 and having an attractive picture or design painted or otherwise applied to it, said picture or design being preferably of sufficient artistic merit to attract the attention of passers-by when exhibited in a public place. Behind the pane 1 is located a member 4, the body of which is opaque, so as to prevent access of light to the pane 1 from the rear, said member being provided with a series of light-outlets 5 5, which may have the form of letters arranged to spell a word or words.

Behind the member 4 and the pane 1 and supported in a suitable casing are a series of incandescent electric lamps 6 6, whose circuits are controlled by a revolving cylinder 8 in such manner as to alternately illuminate and darken the lamps, the light from said lamps passing through the light-outlets 5 5 in the member 4 and falling upon the pane 1, so as to project illuminated areas having the form of said light-outlets on said pane.

7 is an incandescent lamp supported on a suitable bracket in front of and preferably somewhat above the pane 1 and having a shade 29, which may also be a reflector, whereby practically the whole of the light from said lamp may be thrown upon the front of the pane 1. The circuit of the lamp 7 is controlled by the cylinder 8 in such manner that said lamp is illuminated at intervals between the periods of illumination of the lamps 6 6 behind the pane. The cylinder 8 is mounted to rotate in suitable bearings and is provided with a gear 13 on one edge, engaged by a worm 14, mounted on the shaft of an electric motor 15. Current being passed through said motor, the cylinder 8 will be continuously revolved.

9 10 represent a series of contacts, which may be strips of sheet metal affixed by a suitable means to the periphery of the cylinder 8, which latter is composed of a suitable insulating material, such as wood. A suitable number of contact fingers or brushes, which may, as shown in Fig. 7, each consist of a metallic spring-arm 11, having a metal roller 12 on its end, are mounted on a fixed support and adapted to come into electrical contact with the metal strips 9 10 on the surface of the cylinder 8 as the latter is revolved. Said fingers in the arrangement shown in the drawings are connected with the main circuit and with the electrodes or terminals of the incandescent lamps 6 7. The arrangement of the circuits is shown in Fig. 5.

16 17 designate line-wires leading from a suitable source of electric current, said wires being conducted through a switch 18 and a fuse-box 19. The current from the wire 16 is continued through the motor 15 and a resistance 49 and back over a wire 20 to the line-wire 17. A portion of the current before reaching the motor branches through a wire 21 to one of the brushes 11, which is adapted to make contact with the series of strips 9 on the cylinder 8 and also with the series of strips 10. One electrode of each of the lamps 6 6 is connected with the wire 20, and the other electrodes 22 23 24 25 of said lamps are led to four of the brushes 11, which make contact only with the series of strips 9 on the cylinder. One electrode 27 of the lamp 7 is connected with the wire 20, and the other electrode 26 of said lamp is connected with one of the brushes 11, which makes contact only with the series of strips 10. The strips of the series 10 alternate with those of the series 9 on the cylinder 8. It will be seen that the motor 15 is continuously in circuit with the line-wires 16 17 by the above arrangement and that the lamps 6 6 behind the picture-bearing pane are intermittently thrown into parallel or multiple arc connection with the line-wires. In the intervals between the connection of the lamps 6 with the line-wires the lamp 7 is thrown into such connection and illuminated, so that there is an alternate illumination of the lamps 6 and the lamp 7.

As hereinbefore stated, the picture on the pane 1 presents an opaque appearance when illuminated from the front, but is obscurable or effaceable when illuminated from the rear. The effect of the lamp 7 is to strongly illuminate the front of the pane and bring out strongly to the onlooker's vision what apparently is an opaque picture. When the illumination of the lamp 7 ceases and that of the lamps 6 begins, the picture partly or wholly disappears from view, and the illuminated areas stand out with great distinctness on the pane.

Various materials are suitable for the construction of the pane or sheet 1, such materials being glass or porcelain; but as these are of a comparatively frail nature and subject to breakage by reason of the heat of the lamps behind them and also by possible rough usage or exposure to accidents and since, moreover, such materials are comparatively heavy it has been found desirable to employ a non-vitreous material for the construction of the pane. The pane 1, as shown in Figs. 8 and 9, is of a foraminous nature, being composed of strands or meshes of a suitable non-vitreous material. Ordinary wire-gauze of fine mesh, painted with a representation of a picture or design, has been found to answer requirements in this particular. The paint or coloring-matter forming the picture may be applied to the gauze so as to cling to the meshes or strands while leaving open light-transmitting spaces between said meshes or strands, the whole being a translucent structure having the qualities hereinbefore mentioned. It has further been found desirable in practice to interpose a second pane or sheet 28, Fig. 9, of fine wire-gauze, between the pane 1 and the light-transmitting member 4, the effect of which is to interrupt the light and prevent the outline of the light-outlets 5 5 from being visible through the pane 1 when the latter is illuminated from the front without in any way interrupting the transmission of light from the rear onto the pane 1. It has been found that two panes or sheets of the character described give the desired opacity better than a single pane of very fine mesh.

My invention also includes and I intend to claim a foraminous transparent screen adapted to present an opaque appearance when illuminated wholly from the front and obscurable by an excess of light from the rear, together with means under control for illuminating the screen from the front and means under control for illuminating an object or objects in the rear of the screen and visible through the screen.

I claim—

1. In an advertising or display apparatus, the combination of a translucent pane or sheet having a picture or design, said picture presenting an opaque appearance when illuminated wholly from the front, and being obscurable or effaceable by an excess of light from the back, and means for automatically alternately illuminating said pane from the front and from the back, the area illuminated from the back temporarily obscuring or effacing the corresponding portions of the picture.

2. In an advertising or display apparatus, the combination of a translucent pane or sheet having a picture or design, said picture presenting an opaque appearance when illuminated wholly from the front, and being obscurable or effaceable by an excess of light from the back, automatic means for intermittently illuminating said pane from the front, and automatic means for intermittently, during the intervals between periods of illumination from the front, illuminating a definite area or areas of said pane from the back, said area or areas having the form of advertising or display symbols, and temporarily obscuring or effacing the corresponding portions of the picture.

3. In an advertising or display apparatus, the combination of a translucent pane or sheet having a picture or design, said picture presenting an opaque appearance when illuminated wholly from the front, and being obscurable or effaceable by an excess of light from the back, two sets of incandescent lamps located respectively in front of and behind said pane and adapted to throw their light on the front and back sides of the pane respectively, and automatic means for illuminating the two sets of lamps alternately.

4. In an advertising or display apparatus, the combination of a translucent pane or sheet having a picture or design, said picture presenting an opaque appearance when illuminated wholly from the front, and being obscurable or effaceable by an excess of light from the back, two sets of incandescent lamps located respectively in front of and behind said pane and adapted to throw their light on the front and back sides of the pane respectively, automatic means for illuminating the two sets of lamps alternately, and a member interposed between the pane and the set of lamps at the back thereof, and provided with light-outlets having the form of advertising or display symbols.

5. In advertising or display apparatus, the combination of a translucent pane or sheet composed of strands or meshes of a non-vitreous material, said pane having a picture or design which presents an opaque appearance when illuminated wholly from the front, and is obscurable or effaceable by an excess of light from the back, automatic means for intermittently illuminating said pane from the front, one or more incandescent lamps located behind said pane, and automatic means for intermittently illuminating a definite area or areas of said pane with the lamps, said areas having the form of advertising symbols and temporarily effacing or obscuring the corresponding portions of the picture.

6. In advertising or display apparatus, the combination of a translucent pane or sheet composed of strands or meshes of a non-vitreous material, said pane having a picture or design which presents an opaque appearance when illuminated wholly from the front, and is obscurable or effaceable by an excess of light from the back, automatic means for intermittently illuminating said pane from the front, a second translucent pane or sheet composed of strands or meshes and located behind the first said pane, and automatic means for intermittently illuminating a definite area or areas of said panes from the back, said area or areas having the form of advertising or display symbols, and temporarily effacing or obscuring the corresponding portions of the picture.

7. An apparatus of the character specified, comprising, in combination, a foraminous transparent screen adapted to present an opaque appearance when illuminated wholly from the front and obscurable or effaceable by an excess of light from the rear, and automatic means for alternately illuminating the screen from the front and rear.

In testimony whereof I have affixed my signature in presence of two witnesses.

WILLARD H. GILMAN.

Witnesses:
C. F. BROWN,
A. D. HARRISON.